H. M. Hayward,
Hand Saw,
No 68,194. Patented Aug. 27, 1867.
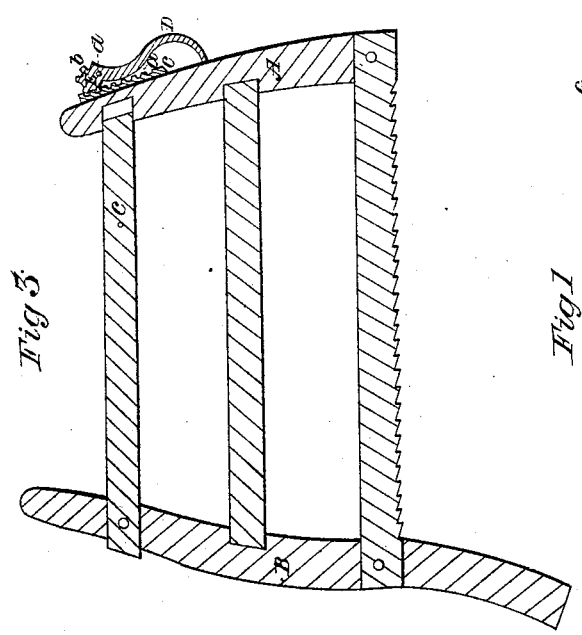
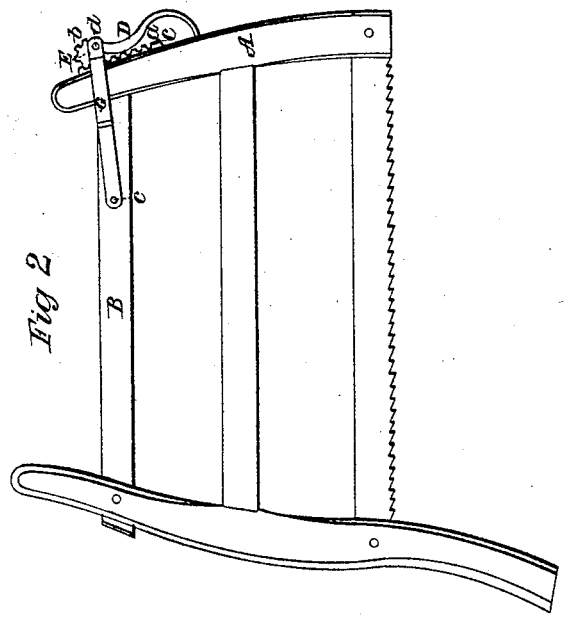
Witnesses
Samuel N. Piper
Lauritz Miller
Inventor:
Henry. M. Hayward.
by his attorney
R. H. Eddy

United States Patent Office.

HENRY M. HAYWARD, OF BOSTON, MASSACHUSETTS.

Letters Patent No. 68,194, dated August 27, 1867.

---

IMPROVEMENT IN BUCK-SAW FRAMES.

---

The Schedule referred to in these Letters Patent and making part of the same.

---

TO ALL PERSONS TO WHOM THESE PRESENTS SHALL COME:

Be it known that I, HENRY M. HAYWARD, of Boston, of the county of Suffolk, and State of Massachusetts, have made a new and useful Improvement in the Straining Mechanism of Wood-Saws; and do hereby declare the same to be fully described in the following specification and represented in the accompanying drawings, of which—

Figure 1 denotes a top view,

Figure 2 a side elevation, and

Figure 3 a longitudinal section of my improved straining mechanism as applied to the end and head-bars of the frame of what is sometimes termed a "buck-saw."

My invention is an improvement on that which constitutes the subject of the United States Patent No. 37,999, dated March 24, 1863; and consists in the combination and arrangement of gear and rack-teeth with the cam of the lever and with the plate against which the periphery of such cam works.

In the drawings, A denotes the end-bar and B the head-bar of the saw-frame. C is the bearing-plate fixed to the end-bar, such plate being furnished with a rack of teeth, as shown at $a$. This plate may be straight, as represented, or it may be curved or arched a little on its cogged surface. D is the lever, furnished with an eccentric or cam, E, on whose periphery are arranged teeth $b$ like those of a gear, such teeth being to work with and between those of the rack. The lever D is connected with the bar B by means of two rods G G arranged on opposite sides of the lever and bar, pins $c$ $d$ being inserted through the rods, the bar, and the lever, as represented. One of these pins constitutes the fulcrum of the lever, and on the other the two rods turn freely.

By having the teeth on the cam and its bearing-plate to operate together, as do those of a rack and pinion, a much better straining mechanism is made than on which my invention is based, as a much finer straining of the saw-blade can be effected, and all chance of accidental displacement of the cam on its bearing-plate is obviated.

Furthermore, the teeth prevent all "back slip" of the cam, and cause it to continually advance while the lever is being turned. The teeth also operate to prevent the "back slip" of the head-bar, which takes place when the cam is used and after it has passed its dead-centre.

I do not claim the subject of the said patent, in which the bearing-plate has no teeth, but has only a series of curved notches to receive the periphery of the cam of the lever, such cam being without any teeth, whereas that of my mechanism, as well as the bearing-plate, has teeth or cogs, as described. In the action of the patented invention the cam turns only on its centre without advancing along the bearing-plate, but with my invention the cam, while being revolved, is advanced by its teeth along the rack-plate, whereby the inclination of the rack-plate is brought into operation as an additional means of effecting the straining of the saw. My additions to the cam and the bearing-plate render the whole mechanism much better and perfectly certain in its operation, as all "back slip" of either the cam E or the head-bar B (to which the invention described in such patent No. 37,999 is constantly liable) is prevented. Therefore, what I claim as my invention, is—

The improved saw-straining mechanism, as described, or in other words the combination and arrangement of the teeth $a$ $b$ with the cam E and its bearing-plate C, when combined with the lever F and its connecting-rods, or the equivalent thereof, the whole to be applied together and to a saw-frame, as specified.

H. M. HAYWARD.

Witnesses:
R. H. EDDY,
F. P. HALE, Jr.